US008823881B2

(12) United States Patent
Chang (10) Patent No.: US 8,823,881 B2
(45) Date of Patent: Sep. 2, 2014

(54) TELEVISION AND CONTROL DEVICE AND CONTROL METHOD (71) Applicant: Hon Hai Precision Industry Co., Ltd., New Taipei (TW)

(72) Inventor: Chih-Chun Chang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/016,156

(22) Filed: Sep. 2, 2013

(65) Prior Publication Data

US 2014/0168520 A1 Jun. 19, 2014

(30) Foreign Application Priority Data

Dec. 18, 2012 (TW) .............................. 101148031 A (51) Int. Cl.
*H04N 5/44* (2011.01)

(52) U.S. Cl.
USPC ........... 348/734; 348/731; 348/730; 348/729; 348/725; 348/724; 348/723; 348/706; 348/705; 348/700; 348/636; 348/656; 348/580; 348/684; 348/693; 348/694; 348/695; 348/696; 348/114; 348/115; 348/553; 348/555; 348/563; 348/565; 348/566; 348/567; 348/568; 348/569; 348/570; 348/571; 348/576; 348/585; 348/588; 348/589; 348/590; 348/591; 725/37; 725/38; 725/39; 725/40; 725/43; 725/44; 725/45; 725/47; 725/50; 725/52; 725/54; 725/55; 725/56; 725/59; 725/61

(58) Field of Classification Search
USPC ......... 348/734, 730, 731, 553, 700, 705, 706, 348/723, 724, 725, 729, 636, 656, 680, 684, 348/693, 694, 695, 696, 555, 563, 565, 566, 348/567, 568, 569, 570, 571, 576, 585, 588, 348/589, 590, 591, 114, 115; 725/38, 39, 725/37, 40, 43, 44, 45, 47, 50, 52, 54, 55, 725/56, 59, 61

See application file for complete search history.

(56) References Cited

U.S. PATENT DOCUMENTS

| | | | |
|---|---|---|---|
| 2010/0005503 A1* | 1/2010 | Kaylor et al. ................. | 725/139 |
| 2010/0199306 A1* | 8/2010 | Colter et al. ................... | 725/38 |
| 2011/0063521 A1* | 3/2011 | Karaoguz et al. ............. | 348/734 |
| 2011/0063522 A1* | 3/2011 | Karaoguz et al. ............. | 348/734 |
| 2011/0063523 A1* | 3/2011 | Karaoguz et al. ............. | 348/734 |
| 2011/0067047 A1* | 3/2011 | Karaoguz et al. ............. | 725/14 |
| 2011/0138416 A1* | 6/2011 | Kang et al. ...................... | 725/39 |
| 2011/0164861 A1* | 7/2011 | Kunkel et al. ................. | 386/343 |
| 2012/0159534 A1* | 6/2012 | Quan et al. ..................... | 725/31 |
| 2012/0162538 A1* | 6/2012 | Dixon et al. .................. | 348/734 |

* cited by examiner

*Primary Examiner* — Jefferey Harold
*Assistant Examiner* — Mustafizur Rahman
(74) *Attorney, Agent, or Firm* — Novak Druce Connolly Bove + Quigg LLP (57) ABSTRACT A control device controls a television. The control device includes a touch module. The control device displays a menu containing a number of soft keys on a screen. The soft keys are activated to control the television to carry out corresponding functions. All positions on the menu are associated with all positions on the touch module correspondingly. As a result, a user can select desired soft keys to carry out corresponding functions by viewing the menu on the television and touching the touch module, rather than viewing the touch module.

14 Claims, 7 Drawing Sheets

TELEVISION AND CONTROL DEVICE AND CONTROL METHOD

BACKGROUND

1. Technical Field

The disclosure relates to televisions, and particularly to a control device and a method for interacting with a television.

2. Description of Related Art

A television not only displays television signals, but also provides special functions other than displaying television signals. For example, the special functions may be a calendar function, a computing function, or a game function, for example. However, the user still operates the television by a typically remote device having a number of keys. In operation, the user needs to look at the remote device to find a desired key, thus the user may be busy viewing the remote device, which is very inconvenient.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

All of the processes described below may be embodied in, and fully automated via, functional code modules executed by one or more general purpose electronic devices or processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

Figure 1:
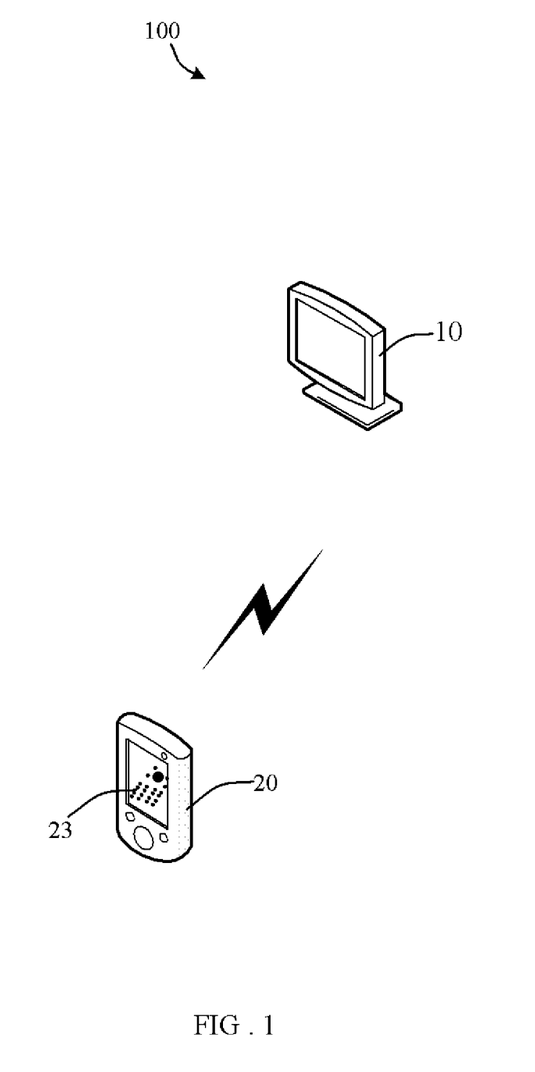
FIG. 1 is a schematic view of a television system in accordance with an embodiment including a television and a control device.

FIG. 1 shows a television system 100. The television system 100 includes a television 10 and a control device 20 for interacting with the television 10. The television 10 communicates with the television 10 wirelessly via known wireless technologies, such as Bluetooth®, WIFI, and RF, for example.

Figure 2:
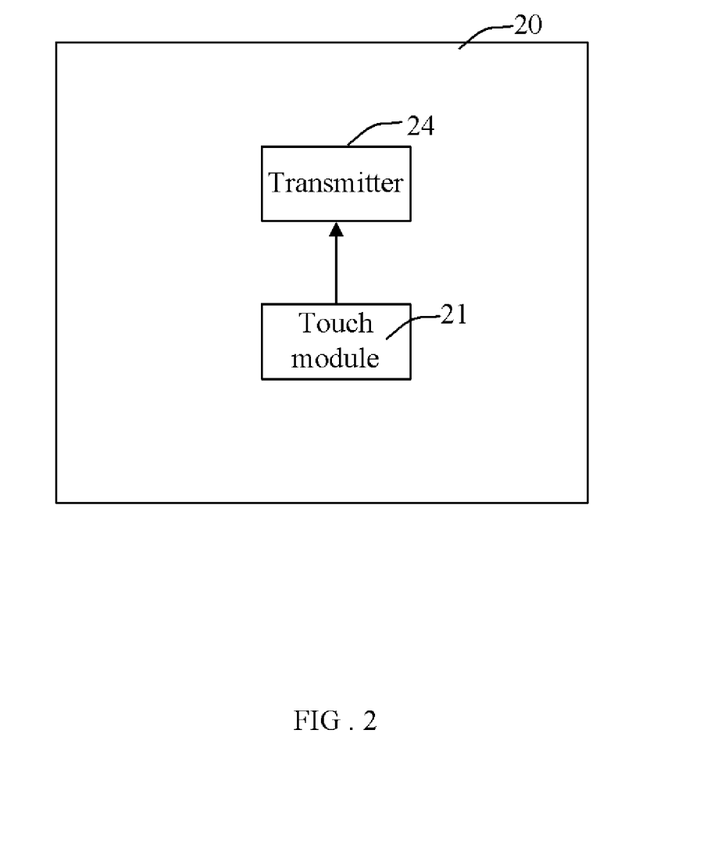
FIG. 2 is a functional block diagram of the control device in FIG. 1.

FIG. 2 shows functional blocks of the control device 20. The control device 20 includes a touch module 21, a transmitter 24, and a number of keys 23 (see FIG. 1). In this embodiment, the touch module 21 is a touch screen. The keys 23 are soft keys displayed on the touch module 21. The keys 23 include number keys, functional keys, and arrow keys for example. In other embodiments, the touch module 21 is a touch panel, the keys 23 are physical keys beside the touch module 21 and the transmitter 24, or the keys 23 are independent from the control device 20.

A user touches the touch module 21 with a finger or a stylus to cause corresponding operations which are pre-set on the touch module 21. In detail, the operations include a start operation, a guiding operation, and a selecting operation. For example, the start operation is that the finger or the stylus touches on the same position touch module 21 for a predetermined time, such as 10 s. The guiding operation is that the touch is that the finger or the stylus slides respect to the touch module 21, or the finger or the stylus touches the touch module 21 for a time shorter than the predetermined time. The selecting operation is that the finger or the stylus is clicked on one position of the touch module 21. As described above, the start operation, the guiding operation, and the selecting operation are different from each other.

The touch module 21 detects whether the operations occurs, and generates instructions corresponding to the operations. In detail, the instructions include a start instruction associated with the start operation, a guiding instruction associated with the guiding operation, and a selecting instruction associated with the selecting operation. The start instruction includes position information associated with the position on the touch module 21 where the finger or the stylus is retained for 10. The guiding instruction includes tracks information associated with tracks of the finger or the stylus sliding with respect to the touch module 21, or position information associated with positions of the touch module 21 where the finger or the stylus touches for a time shorter than 10 s. The selecting instruction includes position information associated with the position where the finger or the stylus touches. The touch module 21 does not display the keys 23, to save power when the start instruction is generated.

The transmitter 24 transmits the start instruction, the guiding instruction, and the selecting instruction to the television 10 to control the television 20 to carry out corresponding functions.

Figure 3:
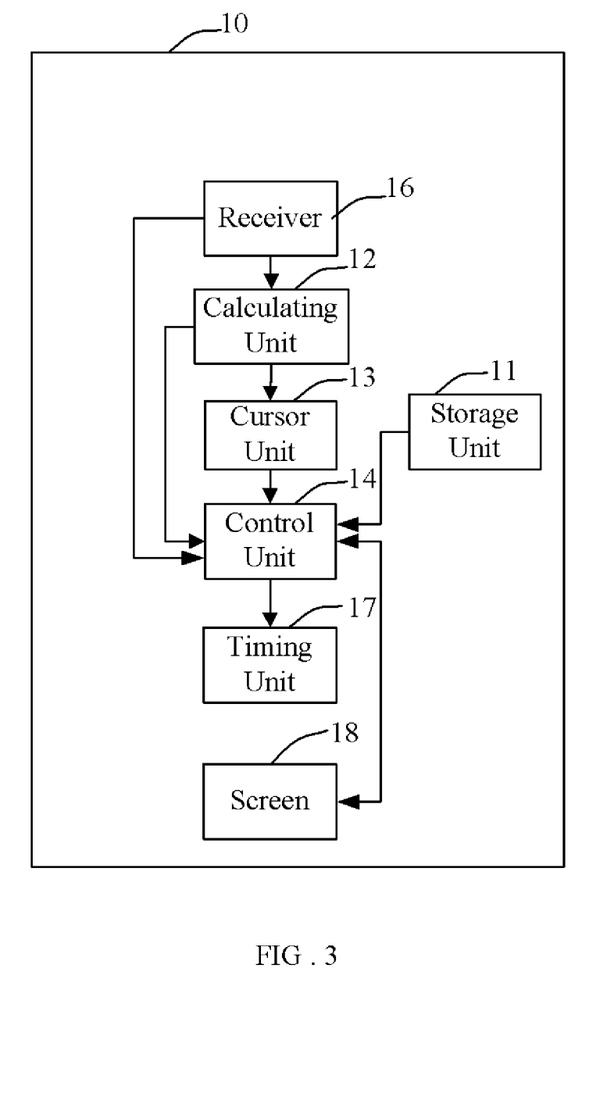
FIG. 3 is a functional block diagram of the television in FIG. 1.

FIG. 3 shows functional blocks of the television 10. The television 10 includes a screen 18, a storage unit 11, a calculating unit 12, a cursor unit 13, a receiver 16, a control unit 14, and a timing unit 17.

Figure 6:
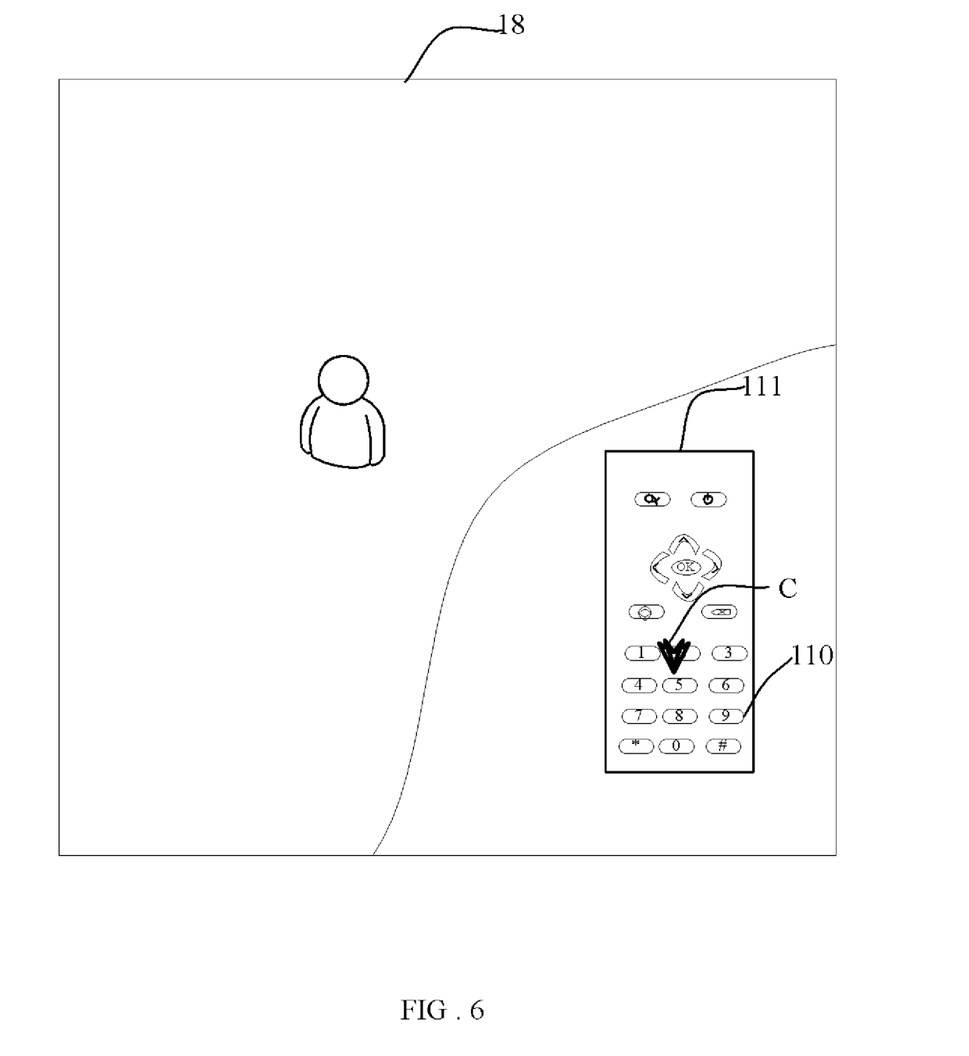
FIG. 6 is a schematic view of a menu displayed on the television.

The storage unit 11 stores a menu 111 containing a number of soft keys 110 (see FIG. 6). The soft keys 110 are associated with a number of functions of the television 10 accordingly, and are activated to cause the television 10 to carry out corresponding functions. The manner of the arrangement of the soft keys 110 is the same with the manner of the arrangement of the keys 23. The soft keys 110 are similar to the keys 23 correspondingly. The storage unit 11 further stores a first position relationship between all positions on the screen 18 and all positions on the touch module 21, a second position relationship between the positions on the menu and the positions on the touch module 21. In detail, the first position relationship is that all positions on the module 21 are associated with all positions on the screen 18 correspondingly. The second position relationship is that all positions on touch module 21 are associated with all positions menu 111 correspondingly. In other embodiments, the menu 111, the first and the second position relationships are stored in the control device 20 and transmitted by the control device 20 to the television 10 when the control device 20 generates the start instruction, rather than being stored in the storage unit 11.

The receiving unit 16 is configured to receive the start instruction, the guiding instruction, and the selecting instruction.

The screen 18 is configured to display the menu 111, and a size of the screen 18 is larger than the touch module 21.

The calculating unit 12 detects whether the receiving unit 16 receives the start instruction. The calculating unit 12 further responds to the start instruction to calculate a position on the screen 18 based on the position information contained in the start instruction and the first position relationship.

The control unit 14 controls the menu 111 to display in the calculated position on the screen 18 (see FIG. 6), and generates a first detect signal. A size of the menu 111 is equal to the size of the touch module 21. In other embodiment, the size of the menu 111 can also be larger or smaller than the touch module 21.

The calculating unit 12 responds to the first detecting signal to detect whether the receiver 16 receives the start instruction again or the guiding instruction when the menu is displayed on the screen 18.

When the receiver 16 does not receive the start instruction or the guiding instruction, the calculating unit 12 generates a timing signal. The timing unit 17 responds to the timing signal by counting a time of the receiver 16 not receiving the start instruction or the guiding instruction, and stops counting the time when the counted time reaches a predetermined time or the start instruction or the guiding instruction is received by the receiver 16. Further, when the counting time reaches the predetermined time, the timing unit 17 generates a close instruction to control the control unit 14 to remove the menu 111 from the screen 18.

Furthermore, when the receiver 16 receives the start instruction again, the control unit generates a calculating instruction to re-calculate the position on the screen 18 to control the control unit 14 to display the menu 111 on the re-calculate position on the screen 18. Thus, the menu 111 is shifted to a different position from the previous position.

Furthermore still, when the receiver 16 receives the guiding instruction, the calculating unit 12 responds to the guiding instruction to calculate a movement track or a first position on the menu 111 based on the second position relationship and the movement track information contained in the guiding instruction, or the second position relationship and the position information contained in the guiding instruction.

Figure 7:
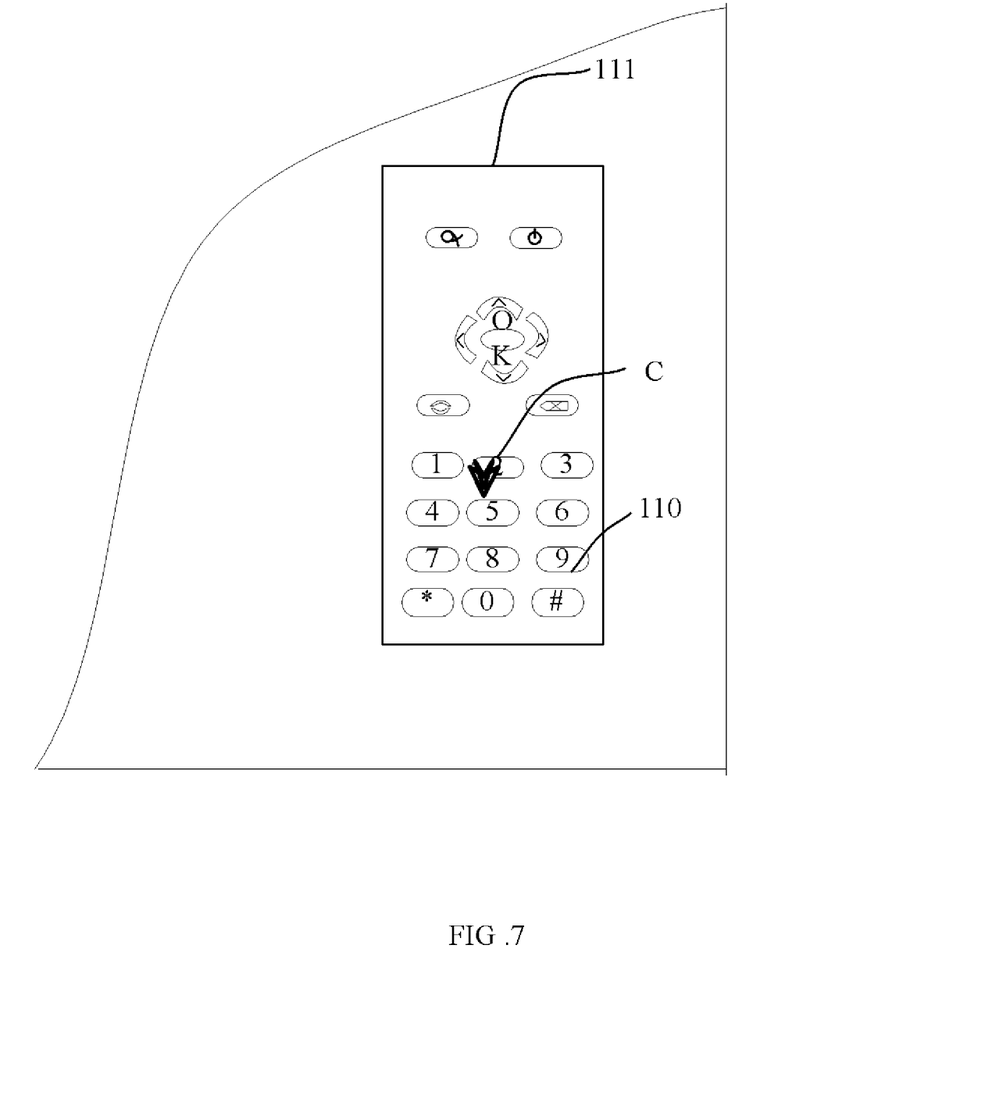
FIG. 7 is a partial enlarge view of the menu in FIG. 6.

The cursor unit 13 generates and displays a cursor C on the calculated first position on the menu 111 or controls the cursor C to shift with respect to the menu according to the calculated movement track (see FIG. 7). Thus, the user is prompted by the cursor C to change touch positions on the touch module 21 to find a desire soft key 110 without viewing the control device 20. The cursor unit 13 further generates a second detect signal when the cursor is displayed on the menu 111.

The calculating unit 12 further detects whether the receiver 16 receives the selecting instruction in response to the second detect signal. When the receiver 16 receives the guiding instruction, the calculating unit 12 further responds to the selecting instruction from the control device 20 to calculate a second position on the menu 111 based on the second position relationship and the position information contained in the selecting instruction. The control unit 14 activates the soft key 110 associated with the calculated second position for carrying out the corresponding function.

As described above, the control method applied to the control device 20 and the television 10 controls the television 10 to activate a desire soft key by touching the touch unit 21 without viewing the control device 20. It is very convenient for the user to operate the television 20.

Figure 4:
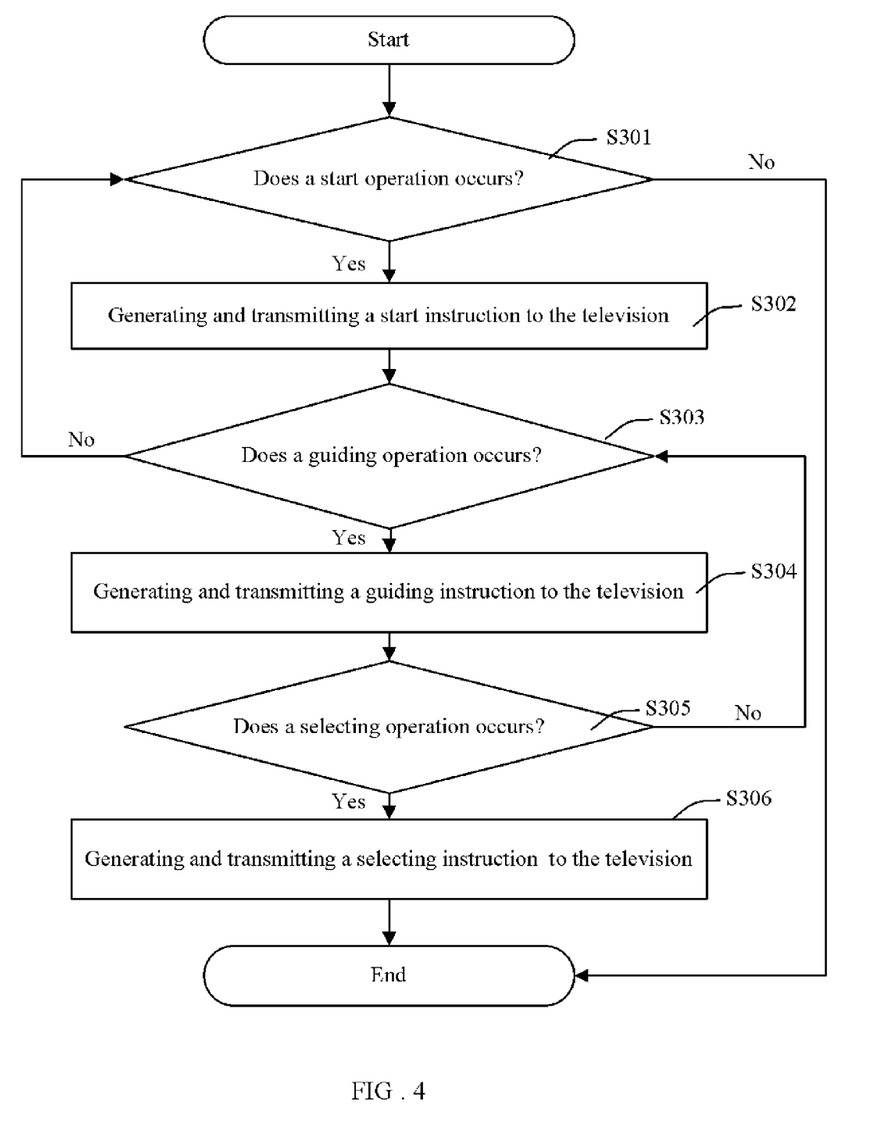
FIGS. 4-5 show flowcharts of a control method in accordance with an embodiment.

FIG. 4 shows a flowchart of a control method applied to the control device 20 for controlling the control device 20 to generate and transmit instructions to the television 10, so as to control the television 10 to carry out corresponding functions.

In step S301, the touch module 21 detects whether a start operation occurs. When the start operation occurs, the process goes to step S302, otherwise, the process is ended For example, the start operation is that a finger or a stylus is retained on one position on the touch module 21 for a predetermined times, such as 10 s.

In step S302, the touch module 21 generates and transmits a start instruction to the television 10, containing position information associated with a position on the touch module 21 where the start operation occurs, and the keys 23 are not displayed.

In step S303, the touch module 21 detects whether a guiding operation occurs. For example, the guiding operation is that the touch is a sliding touch with respect to the touch module 2 or a static touch on the touch module 21. When the guiding operation occurs, the process goes to step S304, otherwise, the process goes to step S301.

In step S304, the touch module 21 generates and transmits a guiding instruction to the television 10, containing movement track information or position information associated with the touch movement track or the touch position on the touch module 21 according to the guiding operation.

In step S305, the touch module 21 detects whether a selecting operation occurs. For example, the selecting operation is that the finger or the stylus selects the touch module 21. When the selecting operation occurs, the process goes to step S305, otherwise, the In step S306, the touch module 21 generates and transmits a selecting instruction to the television 10 containing position information associated with the position where the selecting operation occurs.

Figure 5:
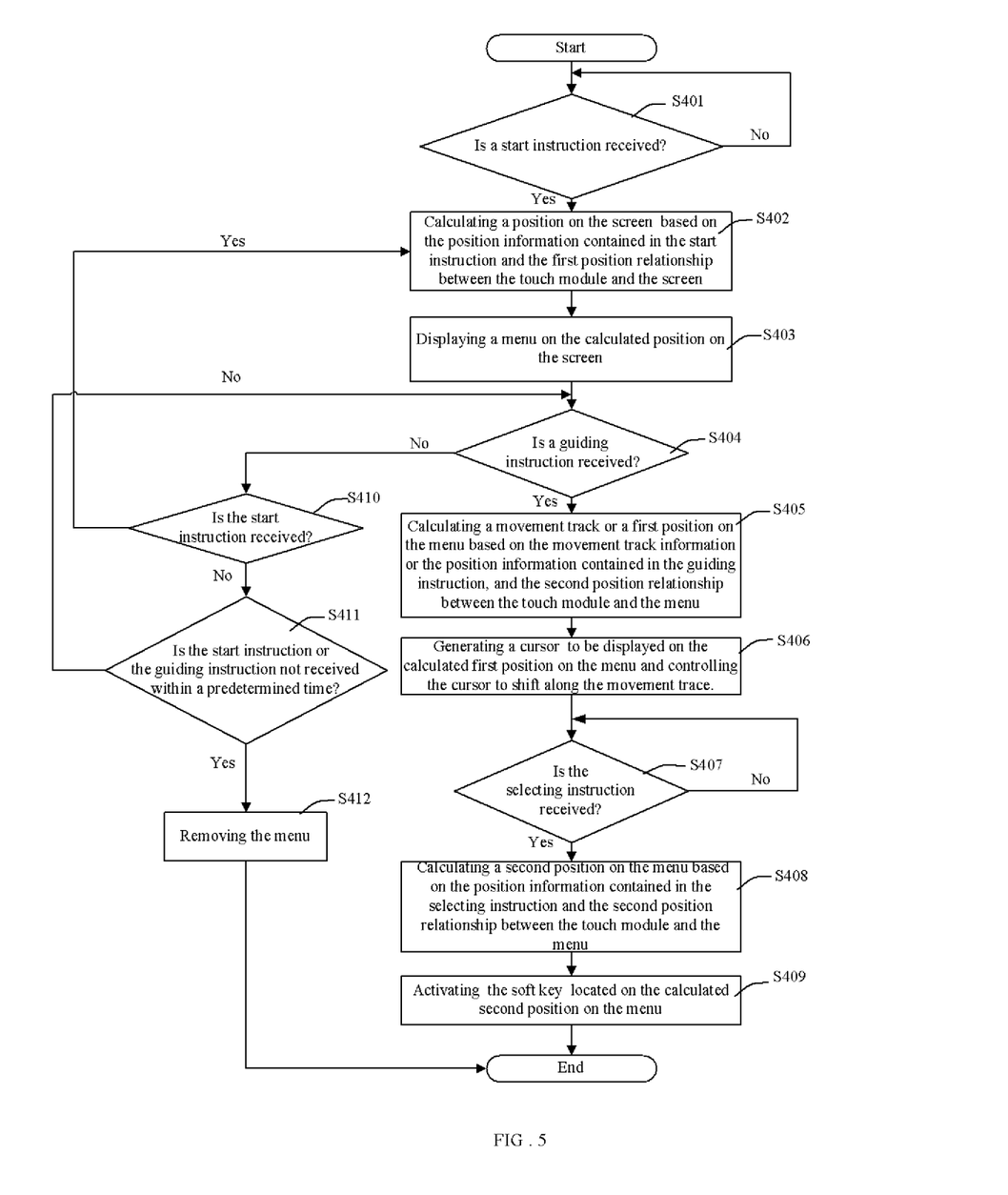

FIG. 5 shows a flowchart of a control method applied to the television 10 for controlling the television 10 to carry out the corresponding functions based on the instructions from the control device 20.

In step S401, the calculating unit 12 detects whether the start instruction is received. When the start instruction is received, the process goes to step S402, otherwise, step S401 is repeated.

In step S402, the calculating unit 12 calculates a position on the screen 18 based on the position information contained in the start instruction associated with the touch module 21 and the first position relationship between the touch module 21 and the screen 18.

In step S403, the control unit 14 controls the menu 111 to be displayed on the calculated position on the screen 18.

In step S404, the calculating unit 12 detects whether the guiding instruction is received. When guiding instruction is received, the process goes to the step S405, otherwise the process goes to step S410.

In step S405, the calculating unit 12 calculates a movement track or a first position on the menu 111 based on the movement track information contained in the guiding instruction and the second position relationship between the touch module and the menu 111, or the position information contained in the guiding instruction and the second position relationship between the touch module and the menu 111.

In step S406, the cursor unit 13 generates a cursor C to be displayed on the calculated first position on the menu 111 and controls the cursor to move along the movement track.

In step S407, the calculating unit 12 detects whether the receiver 16 receives the selecting instruction. When the receiver 16 receives the selecting instruction, the process goes to step S408, otherwise step S407 is repeated.

In step S408, the calculating unit 12 calculates a second position on the menu 111.

In step S409, the control unit 14 activates the soft key 110 located on the calculated second position on the menu 111.

In step S410, the calculating unit 12 detects whether the receiver 16 receives the start instruction again. When the receiver 16 receives the start instruction again, the process goes step S411, otherwise the process goes to step S404.

In step S411, the timing unit determines that the start instruction or the guiding instruction is not received within a predetermined time. When the start instruction or the guiding instruction is not received within a predetermined time, the process goes to step S412, otherwise, the process goes to the step S404.

In step S412, the control unit 14 removes the menu 111 from the screen 18.

As described above, the control method displays a control menu 111 containing a number of soft keys 110 on the television, displays the cursor C on the menu 111, and shifts the cursor C according to movement track of the touch on the touch module 21. Furthermore, the positions on the menu 111 are associated with the positions of the touch module 21 correspondingly. Thus, the user can shift the touch on the touch module 21 under the direction of the cursor C to select the desire soft key 110 without viewing the control device 20.

Even though relevant information and the advantages of the present embodiments have been set forth in the foregoing description, together with details of the functions of the present embodiments, the disclosure is illustrative only; and changes may be made in detail, especially in the matters of shape, size, and arrangement of parts within the principles of the present embodiments to the full extent indicated by the broad general meaning of the terms in which the appended claims are expressed.

What is claimed is:

1. A control device, for interacting with a television, the control device comprising:

a touch module configured to detect whether a start operation occurs, the touch module further configured to generate a start instruction and detect whether a selecting operation occurs after the start operation occurs, the touch module further configured to generate a selecting instruction when the selecting operation occurs, the selecting instruction containing position information associated with a position on the touch module where the selecting operation occurs; and a transmitter configured to transmit the start instruction and the selecting instruction;

wherein the start instruction is configured to control the television to display a menu on a screen containing a plurality of soft keys for operating the control device by viewing the menu on the television, and the start instruction contains position information where the start operation is positioned on the touch module; when the start instruction is generated, all the positions on the touch module are associated with all positions on the screen correspondingly, and the start instruction controls the television to display the menu on the position of the screen associated with the position information contained in the start instruction; when the selecting instruction is generated, all positions on the touch module are associated with all positions in the menu correspondingly, the selecting instruction contains position information where the selecting operation is positioned on the touch module and is used for controlling the television to select at least one of the soft keys in the menu associated with the position information which is contained in the selecting instruction, the soft keys being activated to control the television to carry out corresponding functions according to the position information contained in the selecting instruction.

2. The control device of claim 1, wherein when the guiding operation is generated, all positions on the touch module are associated to all positions in the menu correspondingly; the touch module is further configured to detect whether a guiding operation occurs, generate a guiding instruction containing position information associated with a position on the touch module where the guiding operation occurs, and transmit the guiding instruction to the television to control the television to display a cursor at a position on a menu associated with a position on the touch module, which is associated with the position information contained in the guiding instruction.

3. The control device of claim 1, wherein the touch module is further configured to detect whether a guiding operation occurs, generate a guiding instruction containing movement track information associated with a movement track on the touch module caused by the guiding operation, and transmit the guiding instruction to the television to control the television to display and shift the cursor along the movement track on the menu associated with the movement track on the touch module, which is associated with the movement track information contained in the guiding instruction.

4. The control device of claim 1, wherein the guiding operation is different from the start operation.

5. The control device of claim 4, wherein the start operation is different from the selecting operation.

6. The control device of claim 1, further comprising a plurality of keys displayed on the touch module, and an arrangement manner of the keys is the same with an arrangement manner of the soft keys of the menu.

7. The control device of claim 1, further comprising a plurality of keys set besides the touch module and the transmitter, an arrangement manner of the keys is the same with an arrangement manner of the soft keys of the menu.

8. A television, controlled by a control device, the control device comprising a touch module detecting whether a start operation occurs, generating a start instruction containing position information associated with a position on the touch module where the start operation occurs, and transmitting the start instruction to the television; the touch module further detecting whether a selecting operation, generating a selecting instruction obtaining position information associated with a position on the touch module where the guiding operation occurs when the start instruction is transmitted, and transmitting the guiding instruction to the television, the television comprising:

a control unit controlling a menu containing a plurality of soft keys to display on the screen when the start instruction is received from the control device, when the selecting is generated, all positions on the menu associated with all the positions of the touch module so that a user can view the menu to operate the touch module without viewing the touch module, the soft keys being activated to control the television to carry out corresponding functions; and a calculating unit calculating a first position on the menu associated with the position information contained in the guiding instruction when the guiding instruction is received from the control device for controlling the all positions on the menu associated with all the positions of the touch module;

wherein the control unit actives the soft keys located in the first position on the menu; when the start instruction is received, all positions on the screen are associated with all positions on the touch module correspondingly, and the menu displays on the position of the screen associated with the position information contained in the received start instruction.

9. The television of claim 8, further comprising a cursor unit to generate a cursor when a guiding instruction is received from the control device, the guiding instruction containing position information associated with a position on the touch module where a guiding operation occurs when the guiding operation occurs; based on the received guiding instruction the control unit further controlling all position in the menu to associate with all positions on the touch module correspondingly, and the calculating unit further calculating a position on the menu associated with the position information contained in the guiding instruction, the control unit further controlling the cursor to display on the position in the menu associated with the calculated position by the calculating unit.

10. The television of claim 8, further comprising a cursor unit generating a cursor when a guiding instruction is received from the control device, the guiding instruction containing movement track information associated with a movement track on the touch module cause by a guiding operation when the guiding operation occurs; based on the received guiding instruction the control unit further controlling all position in the menu to associate with all positions on the touch module correspondingly, and the calculating unit further calculating a movement track on the menu associated with the movement track information contained in the guiding instruction, the control unit further controlling the cursor to shift with respect to the menu along the calculated movement track on the menu.

11. The television of claim 10, further comprising a timing unit, the calculated unit further detecting whether the start instruction again or the guiding instruction is received when the menu is displayed on the screen, and generating a timing signal to control the timing unit to count a time of not receiving the start instruction again or the guiding instruction, the timing unit generating a close signal when the counting time reaches a predetermined time, the control unit further responding to the close signal to removes the menu from the screen.

12. A control method, applied to the television to control the television display a menu on a screen, the menu containing a plurality of soft keys to be activated by a control device to control the television to carry out corresponding functions, the control device comprising a touch module detecting whether a start operation occurs, generating a start instruction containing position information associated with a position on the touch module where the start operation occurs, and transmitting the start instruction to the television; the touch module further detecting whether a selecting operation occurs, generating a selecting instruction obtaining position information associated with a position on the touch module where the selecting operation occurs when the start instruction is transmitted, and the touch module further transmitting the selecting instruction to the television; the control method comprising:
  detecting whether the start instruction is received which controls all positions on the screen to associate with all positions of the touch module correspondingly;
  calculating a position on the screen associated with the position information contained in the start instruction when start instruction is received;
  displaying the menu in the calculated position on the screen;
  detecting whether the selecting instruction is received which controls all positions in the menu to associate with all positions of the touch module correspondingly;
  calculating a first position in the menu associated with the position information contained in the selecting instruction when the selecting instruction is received; and
  activating the soft key located on the first position on the menu so that a user can view the menu to operate the touch module to operate the soft keys of the menu without viewing the touch module.

13. The control method of claim 12, wherein after the menu is displayed on the screen and before detecting whether the selecting instruction is received; the control method further comprises:
  detecting whether the guiding instruction is received which controls all the positions in the menu associate with all position on the touch module, the guiding instruction containing position information associated with a position on the touch module where a guiding operation occurs;
  calculating a second position on the menu associated with the position information contained in the guiding instruction; and
  displaying a cursor on the second position.

14. The control method of claim 12, wherein after the menu is displayed on the screen and before detecting whether the selecting instruction is received; the control method further comprises:
  detecting whether the guiding instruction is received from the touch module which controls all the positions in the menu associate with all position on the touch module, the guiding instruction containing movement track information associated with a movement track on the touch module caused by a guiding operation;
  calculating a movement track on the menu associated with the movement track on the touch module which is associated with the movement track information contained in the guiding instruction, and
  displaying and shifting a cursor along the calculated movement track.

* * * * *